United States Patent
Asada

(10) Patent No.: US 7,032,706 B2
(45) Date of Patent: Apr. 25, 2006

(54) SETTING METHOD FOR CONTROL PARAMETER, SETTING DEVICE FOR CONTROL PARAMETER, AND ELECTRIC POWER STEERING DEVICE

(75) Inventor: Atsuhisa Asada, Obu (JP)

(73) Assignee: Toyoda Koki Kabushiki Kaisha, Kariya (JP)

( * ) Notice: Subject to any disclaimer, the term of this patent is extended or adjusted under 35 U.S.C. 154(b) by 59 days.

(21) Appl. No.: 10/806,401

(22) Filed: Mar. 23, 2004

(65) Prior Publication Data

US 2004/0188170 A1 Sep. 30, 2004

(30) Foreign Application Priority Data

Mar. 27, 2003 (JP) ............................. 2003-086785

(51) Int. Cl.
*B62D 5/04* (2006.01)

(52) U.S. Cl. ........................................ 180/446; 701/41
(58) Field of Classification Search ............... 180/444, 180/446; 701/41–43; 73/862.27–862.37
See application file for complete search history.

(56) References Cited

U.S. PATENT DOCUMENTS

| 4,897,603 A * | 1/1990 | Bieber et al. ............ 324/207.2 |
| 6,422,335 B1 * | 7/2002 | Miller ........................ 180/446 |
| 6,598,490 B1 * | 7/2003 | Strothmann ............ 73/862.331 |
| 6,679,350 B1 * | 1/2004 | Shimizu et al. ............. 180/446 |

FOREIGN PATENT DOCUMENTS

| EP | 1 283 148 A2 | 2/2003 |
| EP | 1 291 264 A2 | 3/2003 |
| JP | 2003-75109 | 3/2003 |
| WO | WO 2004/005843 | 1/2004 |

* cited by examiner

*Primary Examiner*—Lesley D. Morris
*Assistant Examiner*—L. Lum
(74) *Attorney, Agent, or Firm*—Oblon, Spivak, McClelland, Maier & Neustadt, P.C.

(57) ABSTRACT

A method for setting a control parameter for an electric power steering device includes process of obtaining a speed ratio between a steering shaft and a motor based on a mechanical angle at the steering shaft obtained from a first steering angle and a second steering angle and a motor electric angle of the motor, and setting the speed ratio as a control parameter used for obtaining the absolute rotational position of the steering wheel from the first steering angle, the second steering angle, and the motor electric angle at the control means.

8 Claims, 6 Drawing Sheets

# SETTING METHOD FOR CONTROL PARAMETER, SETTING DEVICE FOR CONTROL PARAMETER, AND ELECTRIC POWER STEERING DEVICE

INCORPORATION BY REFERENCE

This application is based on and claims priority under 35 U.S.C. § 119 with respect to Japanese Patent Application No. 2003-086785 filed on Mar. 27, 2003, the entire contents of which are incorporated herein by reference.

FIELD OF THE INVENTION

The present invention relates to a setting method for a control parameter, a setting device for a control parameter, and an electric power steering device.

BACKGROUND OF THE INVENTION

A known electric power steering device reduces the steering force by a steering wheel by providing the assisting force to a steering mechanism connected to a steering shaft by a motor. With the known electric power steering device, the steering wheel rotates within a predetermined limited rotation number or greater than a single rotation in the clockwise direction and in the counterclockwise direction respectively. A position of the steering wheel at which the vehicle moves straight is determined as a neutral position. Thus, a steering angle is obtained by detecting the absolute position of the steering wheel, i.e., by detecting the rotation angle of the steering wheel relative to the neutral position.

A known absolute position detection device described in Japanese Patent Laid-Open Publication No. 2003-75109 is disclosed as the sensor for detecting the steering angle by the steering wheel. With the known absolute position detection device described in Japanese Patent Laid-Open Publication No. 2003-75109, the number of pole pairs of a second resolver serving as a part of a torque sensor for detecting the steering torque of the steering wheel and the number of pole pairs of a motor resolver for detecting a motor rotation angle of an assisting motor are determined different from each other. With this construction, the absolute rotational position of the steering wheel is detected by using the characteristics that a difference of detection signal waveforms generated by a cycle difference of detection signals detected from the second resolver and the motor resolver assumes a predetermined amount based on a speed ratio between the steering wheel and the assisting motor.

Notwithstanding, with the known absolute position detection device described in Japanese Patent Laid-Open Publication No. 2003-75109, the speed ratio between the steering wheel and the assisting motor is determined based on a predetermined proportional stroke S and a predetermined lead L serving as a design value, or the like. In this case, the proportional stroke S corresponds to a moving amount of a rack shaft of a rack and pinion mechanism when the steering wheel is rotated by a single rotation. The lead L corresponds to the moving amount of the rack shaft when the assisting motor is rotated by a single rotation. The speed ratio is calculated by S/L.

Accordingly, in case, for example, a pinion gear and a rack groove, or the like, included in the rack and pinion gear mechanism have the machining error and the dispersion, or the like, the error is generated at the speed ratio determined by the predetermined design value, or the like. Further, the error is generated at the quantitative difference of the detection signal waveforms. Thus, it becomes difficult to accurately detect the absolute rotational position of the steering wheel.

A need thus exists for the present invention to provide a setting method of a control parameter and a setting device of the control parameter which enables to determine the control parameter for accurately detecting the absolute rotational position of the steering wheel at an electric power steering device. A need further exists for the present invention to provide an electric power steering device which accurately detects the absolute rotational position of the steering wheel and controls a motor for assisting the steering based on the absolute rotational position.

SUMMARY OF THE INVENTION

In light of the foregoing, the present invention provides a method for setting a control parameter for an electric power steering device which includes a first resolver for detecting a first steering angle including a rotation angle of a steering shaft connected to a steering wheel, a second resolver for detecting a second steering angle including a rotation angle of the steering shaft, the second resolver including pole pairs different number from the first resolver, a rack and pinion type steering mechanism including a rack shaft geared with a pinion shaft coaxially connected to the steering shaft, a motor for assisting an actuation of the rack shaft, a third resolver for detecting a motor electric angle including a rotation angle of the motor, and a control means for controlling the motor based on the absolute rotational position of the steering wheel obtained from the first steering angle, the second steering angle, and the motor electric angle. The setting method includes process of obtaining a speed ratio between the steering shaft and the motor based on a mechanical angle at the steering shaft obtained from the first steering angle and the second steering angle and the motor electric angle of the motor, and setting the speed ratio as a control parameter used for obtaining the absolute rotational position of the steering wheel from the first steering angle, the second steering angle, and the motor electric angle at the control means.

According to another aspect of the present invention, a setting device for a control parameter of the power steering device includes a first resolver for detecting a first steering angle including a rotation angle of a steering shaft connected to a steering wheel, a second resolver for detecting a second steering angle including a rotation angle of the steering shaft, the second resolver including pole pairs different number from the first resolver, a rack and pinion type steering mechanism including a rack shaft geared with a pinion shaft coaxially connected to the steering shaft, a motor for assisting an actuation of the rack shaft, a third resolver for detecting a motor electric angle including a rotation angle of the motor, a control means for controlling the motor based on the absolute rotational position of the steering wheel obtained from the first steering angle, the second steering angle, and the motor electric angle. The setting device includes a speed ratio calculation means for obtaining a speed ratio between the steering shaft and the motor based on a mechanical angle at the steering shaft obtained from the first steering angle and the second steering angle and the motor electric angle of the motor, and a parameter setting means for setting the obtained speed ratio at the control means as a control parameter used for obtaining the absolute rotational position of the steering wheel from the first steering angle, the second steering angle, and the motor electric angle.

According to still further aspect of the present invention, an electric power steering device includes a first resolver for detecting a first steering angle including a rotation angle of a steering shaft connected to a steering wheel, a second resolver for detecting a second steering angle including a rotation angle of the steering shaft, the second resolver including pole pairs different number from the first resolver, a rack and pinion type steering mechanism including a rack shaft geared with a pinion shaft coaxially connected to the steering shaft, a motor for assisting an actuation of the rack shaft, a third resolver for detecting a motor electric angle including a rotation angle of the motor, and a control means for controlling the motor based on the absolute rotational position of the steering wheel obtained from the first steering angle, the second steering angle, and the motor electric angle. The motor is controlled based on the absolute rotational position of the steering wheel obtained from the first steering angle, the second steering angle, and the motor electric angle using a control parameter set by a setting method of the control parameter. The setting method includes process of obtaining a speed ratio between the steering shaft and the motor based on a mechanical angle at the steering shaft obtained from the first steering angle and the second steering angle and the motor electric angle of the motor, and setting the speed ratio as a control parameter used for obtaining the absolute rotational position of the steering wheel from the first steering angle, the second steering angle, and the motor electric angle at the control means.

According to still another aspect of the present invention, an electric power steering device includes a first resolver for detecting a first steering angle including a rotation angle of a steering shaft connected to a steering wheel, a second resolver for detecting a second steering angle including a rotation angle of the steering shaft, the second resolver including pole pairs different number from the first resolver, a rack and pinion type steering mechanism including a rack shaft geared with a pinion shaft coaxially connected to the steering shaft, a motor for assisting an actuation of the rack shaft, a third resolver for detecting a motor electric angle including a rotation angle of the motor, and a control means for controlling the motor based on the absolute rotational position of the steering wheel obtained from the first steering angle, the second steering angle, and the motor electric angle. The motor is controlled based on the absolute rotational position of the steering wheel obtained from the first steering angle, the second steering angle, and the motor electric angle using the control parameter set by a setting device of a control parameter. The electric power steering device further includes a speed ratio calculation means for obtaining a speed ratio between the steering shaft and the motor based on a mechanical angle at the steering shaft obtained from the first steering angle and the second steering angle and the motor electric angle of the motor, and a parameter setting means for setting the obtained speed ratio at the control means as a control parameter used for obtaining the absolute rotational position of the steering wheel from the first steering angle, the second steering angle, and the motor electric angle.

BRIEF DESCRIPTION OF THE DRAWING FIGURES

The foregoing and additional features and characteristics of the present invention will become more apparent from the following detailed description considered with reference to the accompanying drawing figures in which like reference numerals designate like elements.

DETAILED DESCRIPTION OF THE INVENTION

Figure 1:
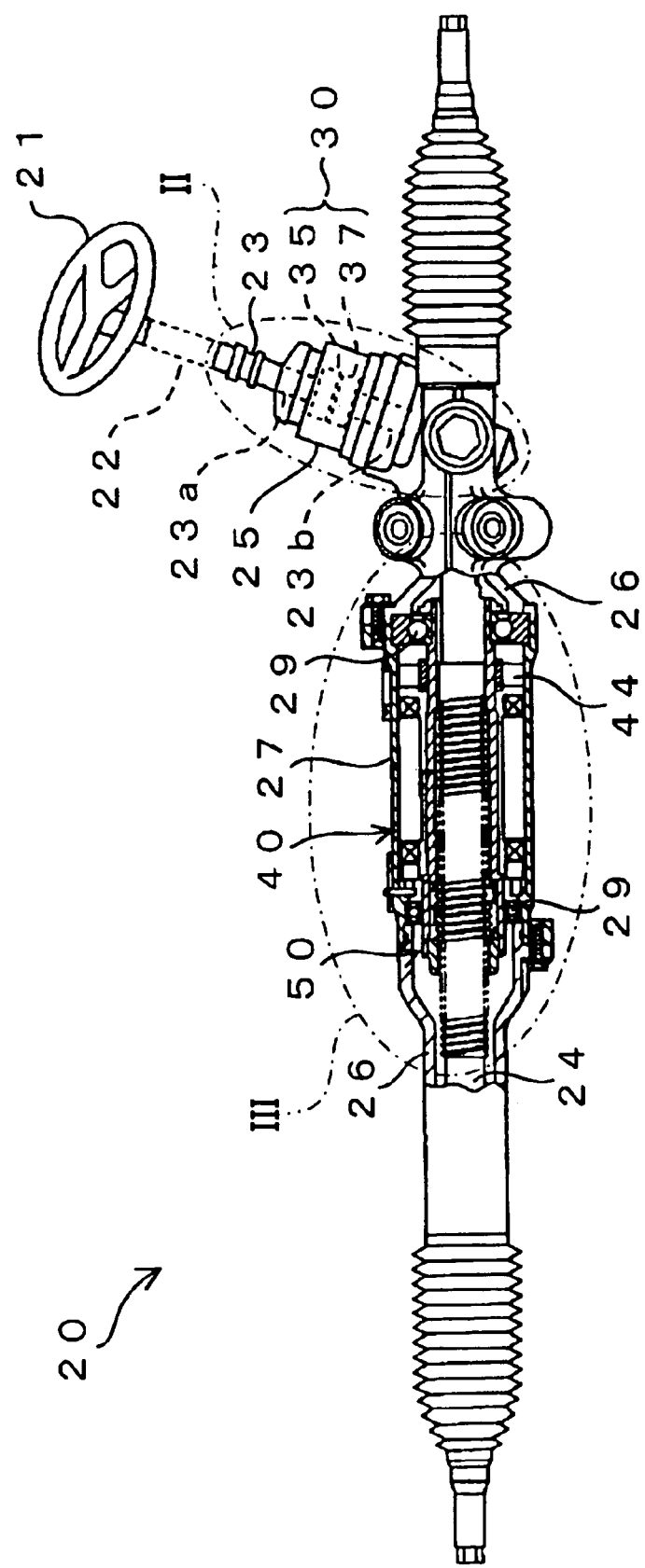
FIG. 1 is an overview showing an electric power steering device according to an embodiment of the present invention.

One embodiment of the present invention will be explained with reference to the illustrations of the drawing figures as follows.

An embodiment of a setting method of a control parameter of the present invention and an embodiment of an electric power steering device of the present invention will be explained referring to FIGS. 1–6.

Figure 4:
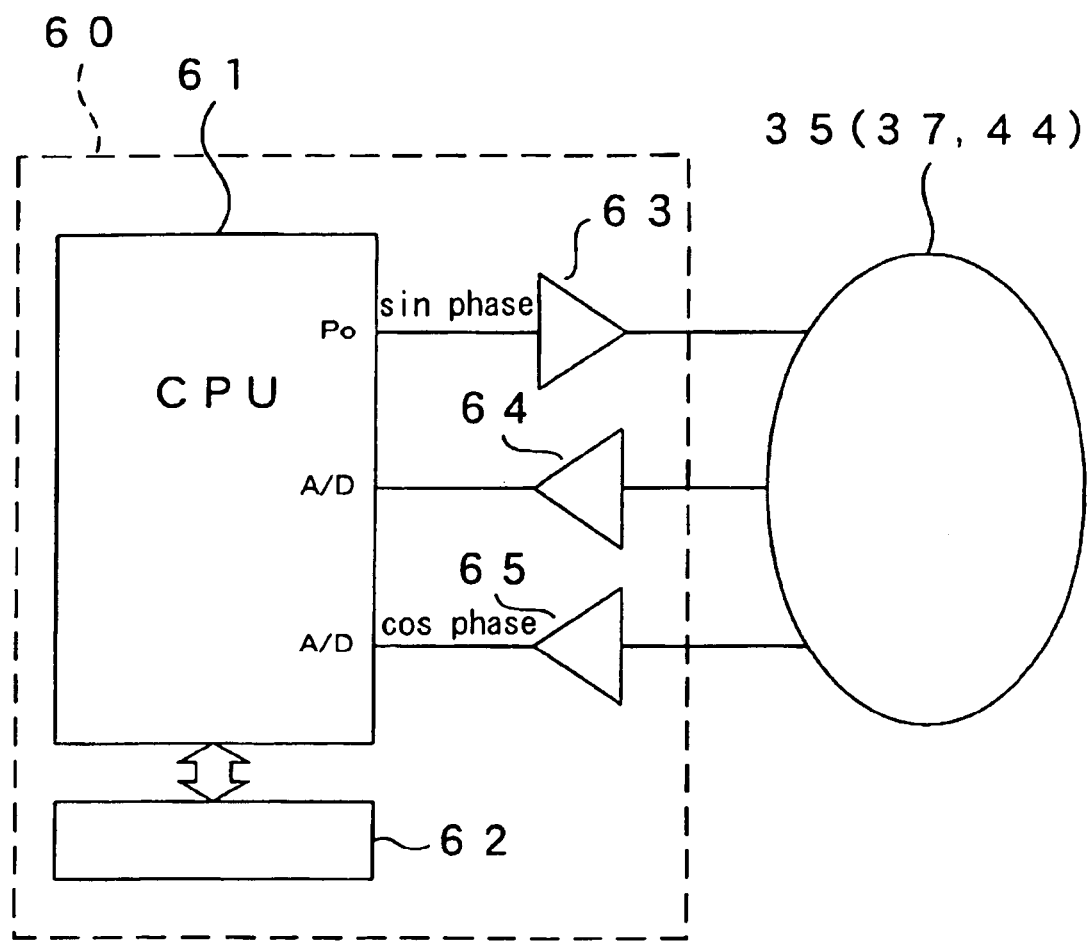
FIG. 4 is a block view showing a connecting construction between an ECU for controlling the electric power steering device and a resolver according to the embodiment of the present invention.

As shown in FIGS. 1, 4, an electric power steering device 20 includes a steering wheel 21, a steering shaft 22, a pinion shaft 23, a rack shaft 24, a torque sensor 30, a motor 40, a motor resolver 44, a ball screw mechanism 50, and an ECU 60 serving as a control means. The steering state of steering wheel 21 is detected by the torque sensor 30, and the motor 40 generates the assisting force in accordance with the steering state to assist the steering operation of an operator. Vehicle wheels are connected to the both sides of the rack shaft 24 via tie rods respectively.

Figure 2:
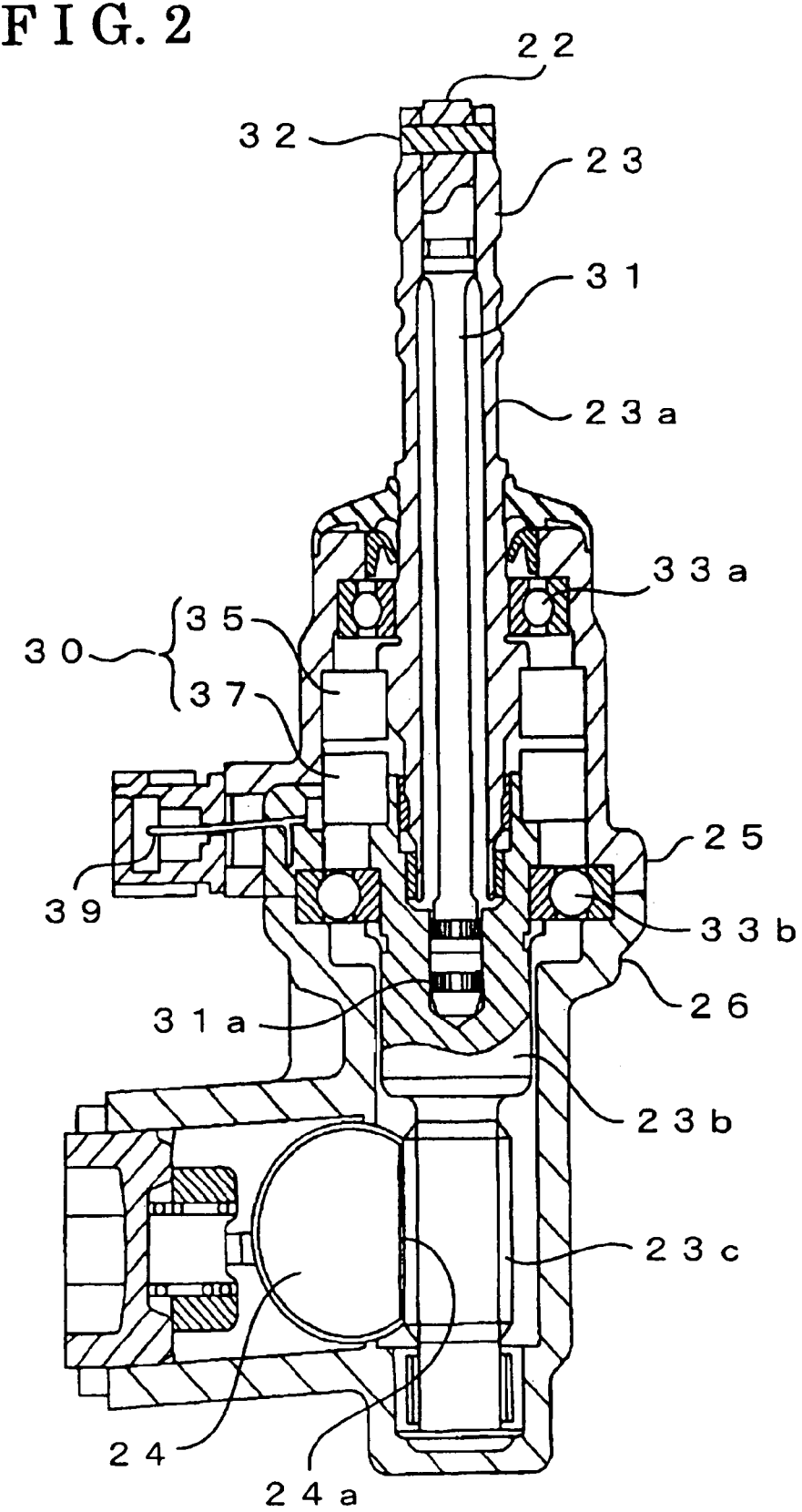
FIG. 2 is an enlarged view of a part of the electric power steering device in an ellipse indicated with a chain dotted II as shown in FIG. 1.

As shown in FIGS. 1–2, a first end of the steering shaft 22 is connected to the steering wheel 21. A second end of the steering shaft 22 is connected to an input shaft 23a of the pinion shaft 23 and the input shaft 23a is connected to a first end of a torsion bar 31 by a pin 32. A second end 31a of the torsion bar 31 is connected to an output shaft 23b of the pinion shaft 23 with spline connection.

The input shaft 23a of the pinion shaft 23 is rotatably supported in a pinion housing 25 by a bearing 33a. The output shaft 23b is supported in the pinion housing 25 by a bearing 33b. A first resolver 35 is provided between the input shaft 23a and the pinion housing 25. A second resolver 37 is provided between the output shaft 23b and the pinion housing 25. The first resolver 35 and the second resolver 37 included in the torque sensor 30 detects the steering angle of the steering wheel 21 and are electrically connected to the ECU 60 via a terminal 39 as shown in FIG. 4.

A pinion gear 23c is formed at an end portion of the output shaft 23b of the pinion shaft 23. The pinion gear 23c is selectively geared with a rack groove 24a of the rack shaft 24. As foregoing, the rack and pinion steering mechanism is constructed.

Figure 3:
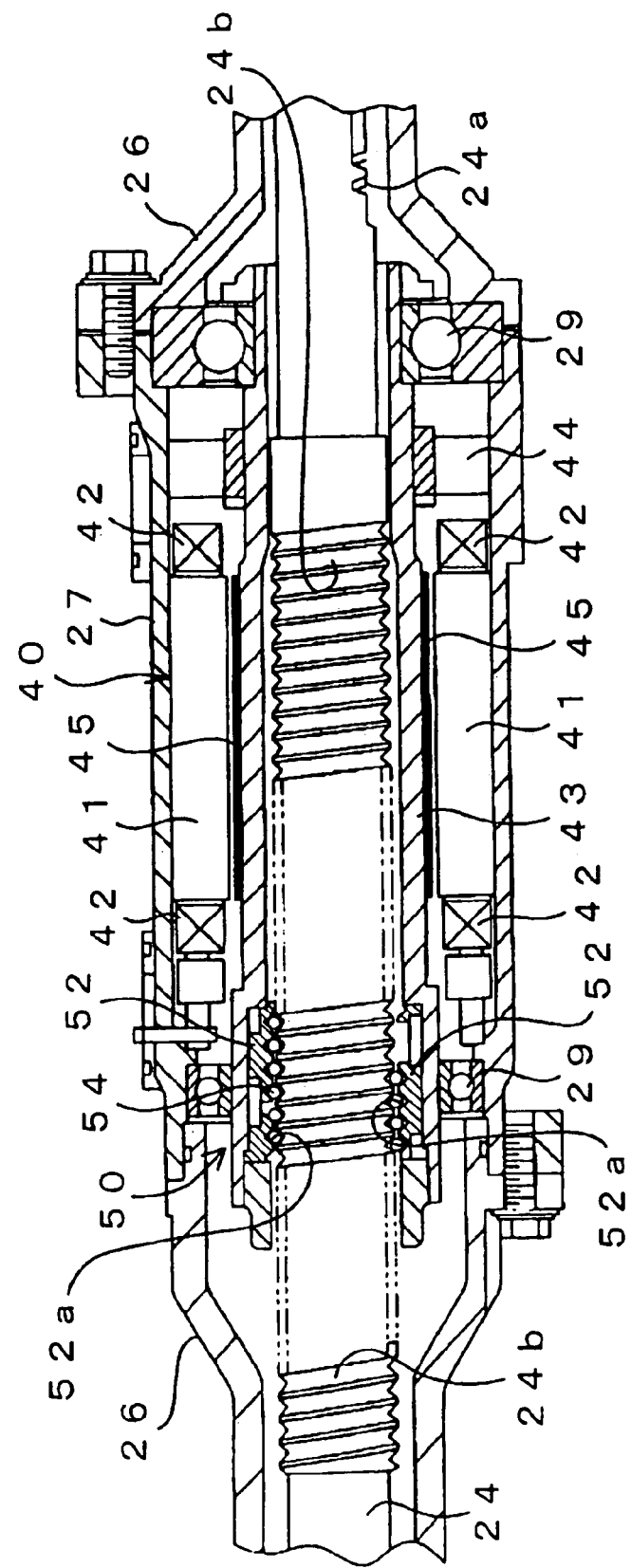
FIG. 3 is an enlarged view of a part of the electric power steering device in an ellipse indicated with a chain dotted III as shown in FIG. 1.

As shown in FIGS. 1–3, the rack shaft 24 is accommodated in the rack housing 26 and the motor housing 27. A ball screw grooves 24b are spirally formed at intermediate portions of the rack shaft 24. A cylindrical motor shaft 43 supported by a bearing 29 is provided about the ball screw groove 24b to be rotatable coaxially with the rack shaft 24. The motor shaft 43 is included in the motor 40 likewise a stator 41 and an excitation coil 42, or the like. The magnetic field generated by the excitation coil 42 wound around the stator 41 affects a permanent magnet 45 provided at an external periphery of the motor shaft 43 serving as a rotor to rotate the motor shaft 43.

A ball screw nut 52 is provided at an internal periphery of the motor shaft 43. A ball screw groove 52a is formed at the ball screw nut 52 spirally. Thus, a ball screw mechanism 50 for moving the rack shaft 24 in the axial direction by the rotation of the motor shaft 43 is constructed by providing numbers of balls 54 between the ball screw groove 52a of the ball screw nut 52 and the ball screw groove 24b of the rack shaft 24.

In other words, the rotational torque in the normal and reverse directions of the motor shaft 43 is converted into the reciprocating motion in the axial direction of the rack shaft 24. Accordingly, the reciprocating motion serves as the assisting force for reducing the steering force of the steering wheel 21 via the pinion shaft 23 included in the rack and pinion type steering mechanism.

A motor resolver 44 for detecting a rotation angle (i.e., an electric angle) $\theta Me$ of the motor shaft 43 is provided between the motor shaft 43 of the motor 40 and the motor housing 27. The motor resolver 44 serving as a third resolver is electrically connected to the ECU 60 via terminals.

The ECU 60 serving as the control means, a speed ratio calculation means, and a parameter setting means includes a CPU 61, a nonvolatile memory 62 serving as a memory means, and amplifiers 63, 64, 65. The CPU 61 is electrically connected to the first resolver 35, the second resolver 37, and the motor resolver 44 via the amplifiers 63, 64, 65. The CPU 61 is further connected to the nonvolatile memory 62 and a semiconductor memory device serving as a main memory device, or the like via a system bus. A program, or the like, regarding a control parameter setting transaction is stored in a main memory device. The nonvolatile memory 62 includes EEPROM such as a flash memory, a magnetic memory device such as a hard disc device, and an optical magnetic memory device such as a MO disc device, or the like.

Regarding the construction of the first resolver 35, the second resolver 37, and the motor resolver 44 and the electric characteristics thereof, Japanese Patent Laid-Open Publication No. 2003-75109 (corresponding to U.S. patent application Ser. No. 10/233,495), Japanese Patent Application No. 2002-196131 (corresponding to International Patent Publication No. WO 2004/005843A1), and Japanese Patent Application No. 2003-73807 are incorporated herein by reference.

With the construction of the first resolver 35, the second resolver 37, and the motor resolver 44 described in Japanese Patent Laid-Open Publication No. 2003-75109, Japanese Patent Application No. 2002-196131, and Japanese Patent Application No. 2003-73807, the rotation angle of the steering shaft 22, i.e., the mechanical angle $\theta Tm$ of the steering wheel 21 (i.e., the mechanical angle of the pinion shaft side) can be detected by a first steering angle $\theta T1$ by the first resolver 35 and a second steering angle $\theta T2$ by the second resolver 37. Moreover, the torsion of the torsion bar 31 in accordance with the steering torque can be detected as a torsion angle from an angle difference between the first steering angle $\theta T1$ and the second steering angle $\theta T2$ and the angle ratio, or the like.

Because a steering torque T is calculated from a relative rotation angle difference $\Delta\theta$ serving as the torsion angle of the torsion bar 31 and the rigidity of the torsion bar 31, the steering operation of the operator can be assisted by the steering force generated by the motor 40 by conducting the assisting control for assisting the steering force in accordance with the steering torque T by the CPU 61 of the ECU 60.

The first resolver 35 included in the torque sensor 30 has five pole pairs (10 poles) corresponding to including five pairs of the N poles and the S poles electrically. Thus, the first steering angle (i.e., electric angle) $\theta T1$ obtained from the first resolver 35 forms five peaks by a rotation (i.e., mechanically 360 degrees) of the steering wheel 21. Because the first resolver 35 outputs the electric angle corresponding to five times of one rotation relative to the mechanical angle 360 degrees (i.e., 360°·5=1800°), the first resolver 35 includes the resolution five times of the resolver which has one pole pair.

In the meantime, the second steering angle (i.e., electric angle) $\theta T2$ obtained from the second resolver 37 included in the torque sensor 30 forms six peaks by the rotation (i.e., mechanically 360°) of the steering wheel 21. Because the second resolver 37 has six pole pairs (twelve poles) corresponding to including six pairs of the N poles and the S poles electrically, the electric angle corresponding to six times of the rotation relative to the mechanical angle 360° (i.e., 360°·6=2160°) is outputted. Thus, the second resolver 37 includes the resolution six times of the resolver which has one pole pair.

Figure 5:
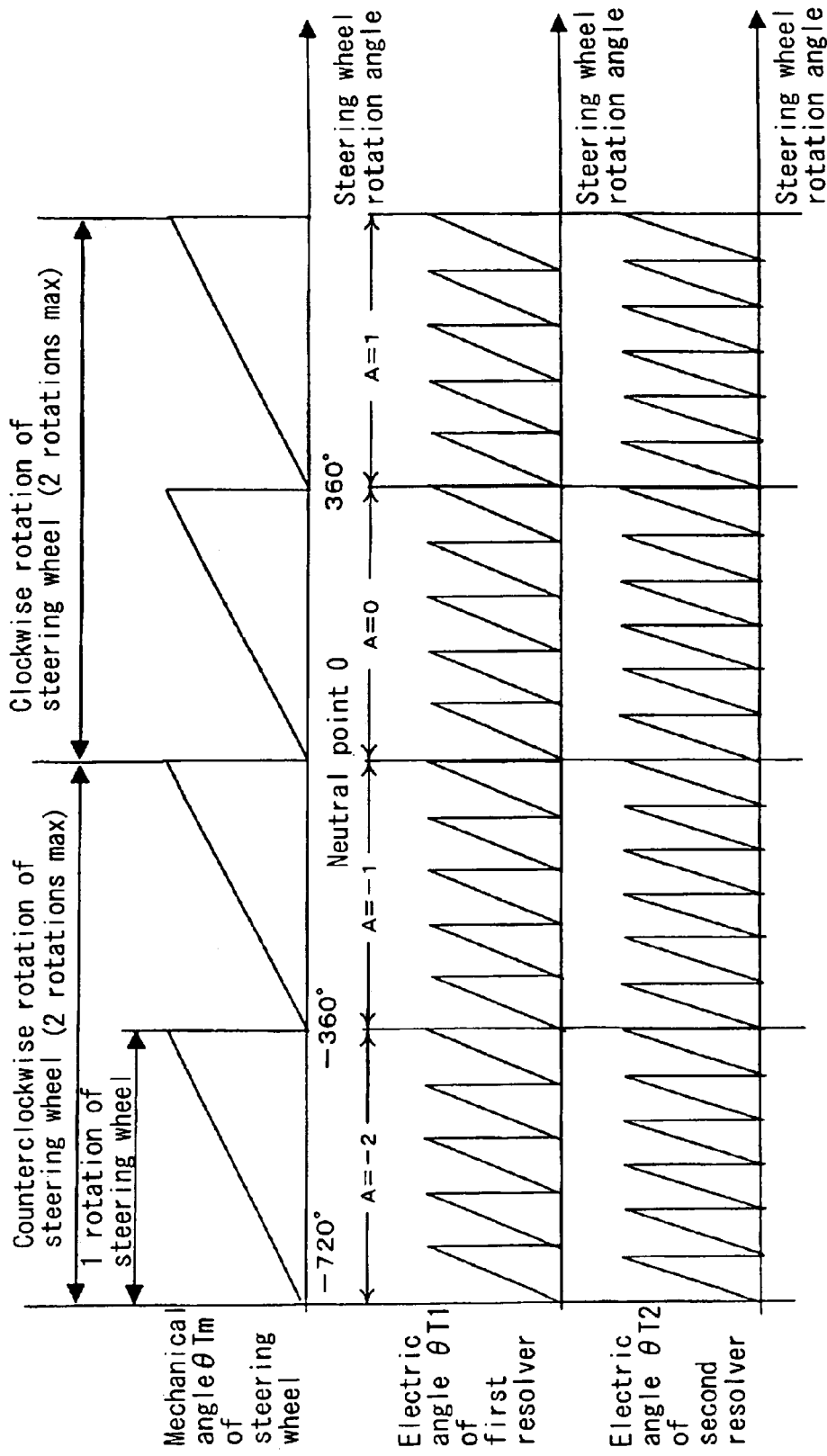
FIG. 5 is a characteristic view showing resolver output signals of a first resolver and a second resolver relative to a rotation angle of a steering wheel and a mechanical angle of the steering wheel.

Thus, the first resolver 35 outputs the electric angle $\theta T1$ as the resolver output signal and the second resolver 37 outputs the electric angle $\theta T2$ as the resolver output signal. As shown in FIG. 5, the waveforms of the output signals of the electric angle $\theta T1$ and the electric angle $\theta T2$ do not show the same waveforms at the rotation angle of the steering wheel 21. Thus, by conducting the calculation transaction by the CPU 61 based on the electric angle $\theta T1$ of the first resolver 35 and the electric angle $\theta T2$ of the second resolver 37, the mechanical angle $\theta Tm$ of the high resolution can be attained relative to the rotation of the steering wheel 21.

As shown in FIG. 5, with the electric power steering device 20 because the steering wheel 21 rotates two rotations in the clockwise direction and in the counterclockwise direction from the neutral point, each rotational amount (A=1, 0, −1, −2) cannot be identified by the first and the second resolvers 35, 37 included in the torque sensor 30. Thus, the motor rotational angle (i.e., electric angle $\theta Me$) of the motor 40 is detected by the motor resolver 44 and a calculated motor electric angle $\theta Me$ (A) is calculated by the ECU 60.

In other words, four calculated motor electric angles $\theta Me(1)$, $\theta Me(0)$, $\theta Me(-1)$, $\theta Me(-2)$ corresponding to A=1, 0, −1, −2 are calculated at the calculation transaction by a formula 1. Further, after rounding off four calculated motor electric angles $\theta Me$ (A) within a predetermined range, the value closest to an actual motor electric angle $\theta Me$ (distinguished from the calculated motor electric angles $\theta Me$ (A)) is selected from each rotational amount (A=1, 0, −1, −2).

$$\theta Me\ (A)=(\theta Tm+360 \cdot A) \cdot r \qquad \text{[Formula 1]}$$

As shown in FIG. 5, even when the steering wheel sensor 21 rotates within the limited rotation number equal to or greater than one rotation in the clockwise direction and the counterclockwise direction, the absolute rotational position of the steering wheel 21 can be detected by the first resolver 35, the second resolver 37, and the motor resolver 44 included in the torque sensor 30.

Wherein, r corresponds to the product value of a deceleration gear ratio of the ball screw mechanism 50 and the number of pole pairs of the motor resolver 44, which assumes a non-integer including the decimal place. For example, in case the deceleration gear ratio of the ball screw mechanism 50 is determined at 8.2 and the number of pole pairs of the motor resolver 44 is determined at 7, the product value r equals to 57.4 (r=8.2·7). In the present embodiment, the number of pole pairs of the motor resolver 44 is set to be same as the number of the pole pairs of the motor 40.

In other word, the deceleration gear ration of the ball screw mechanism 50 is a speed ratio Mrev between the rotational amount of the steering wheel 21 (i.e. steering shaft 22) and the rotational amount of the motor 40. Therefore, the product value r is obtained as a product of the speed ratio Mrev and number of pole pair of the motor resolver 44. The speed ratio Mrev may be defined as the rotation number of the motor 40 when the steering wheel 21 rotates by one rotation. The speed ratio Mrev is obtained by dividing the proportional stroke S by the lead L. In other words, the speed ratio Mrev is obtained by dividing the proportional stroke S corresponding to the moving amount of the rack shaft 24 when the steering wheel 21 is rotated by one rotation by the lead L corresponding to the moving amount of the rack shaft 24 when the motor 40 is rotated by one rotation (Mrev=S/L). A predetermined value such as a design value may be set as the speed ratio.

In case the predetermined value such as the design value is set as the speed ratio Mrev, the error is provided at the speed ratio Mrev when the machining error and the dispersion, or the like, is generated at the mechanical parts such as the pinion gear 23c of the pinion shaft 23 and the rack groove 24a of the rack shaft 24 included in the steering mechanism. Thus, the error included in the speed ratio Mrev directly influences on the product value r obtained as the product between the speed ratio Mrev and the number of pole pairs P. Thus, the precision of the calculated motor electric angle θMe (A) calculated from the formula 1 is declined, which may cause the wrong selection when selecting the value closest to the actual motor electric angle θMe from rotational mounts (A=1, 0, −1, −2).

Figure 6:
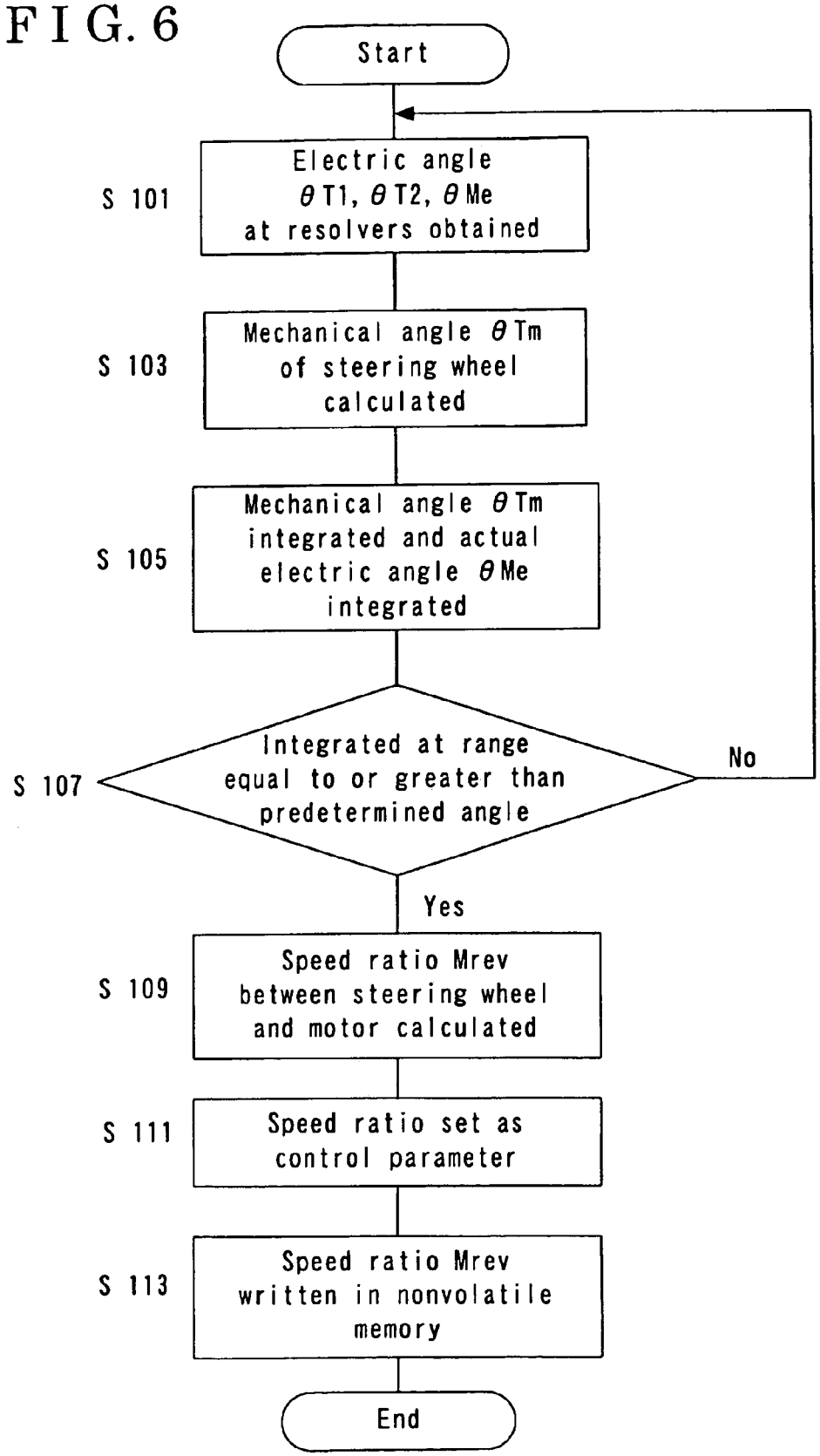
FIG. 6 is a flowchart showing a flow of a control parameter setting transaction carried out by an ECU shown in FIG. 4.

With the electric power steering device 20, the speed ratio Mrev unlikely including the error is calculated by the parameter determination transaction shown in FIG. 6 so that the speed ratio Mrev is defined as the control parameter. The control parameter setting transaction shown in FIG. 6 is conducted by carrying out the program stored in the main memory device included in the ECU 60 by the CPU 61.

As shown in FIG. 6, each electric angle θT1, θT2, θMe of respective resolvers varied within the range equal to or greater than the predetermined angle is integrated at Steps S101–S107 at the control parameter setting transaction.

At Step S101, the first steering angle (i.e., electric angle) θT1 detected by the first resolver 35, the second steering angle (i.e. electric angle) θT2 detected by the second resolver 37, and the actual motor electric angle θMe of the motor shaft 43 detected by the motor resolver 44 are obtained. Thereafter, at Step S103, the mechanical angle (i.e., the mechanical angle at the pinion shaft 23 side) θTm of the steering wheel 21 is calculated from the electric angles θT1, θT2. The transaction for integrating the calculated mechanical angle θTm and the actual motor electric angle θMe by the last calculated values thereof respectively is conducted at Step S105.

Whether the integration transaction is conducted within the range equal to or greater than the predetermined angle is judged at Step S107. In case it is not judged that the integration is conducted within the range of equal to or greater than the predetermined angle (i.e., No at Step 107), the transaction is returned to Step S101 to conduct the transactions to Step S105 to further integrate the mechanical angle θTm and the actual motor electric angle θMe respectively. The predetermined angle of the range equal to or greater than the predetermined angle judged at Step S107 may be, for example,. defined as 1440 degrees corresponding to the four rotations of the steering wheel 21, as 360 degrees corresponding to one rotation of the steering wheel 21, and 90 degrees corresponding to one fourth rotations of the steering wheel 21, or the like. In the meantime, in case it is judged that the integration is conducted within the range equal to or greater than the predetermined angle at Step S107 (i.e., Yes at S107), the speed ratio Mrev between the steering wheel 21 and the motor 40 is calculated at the consecutive transaction at Step S109.

At Step S109, the speed ratio Mrev between the steering wheel 21 and the motor 40 is calculated by a formula 2 based on the mechanical angle θTm of the steering wheel 21 and the actual motor electric angle θMe integrated respectively at Steps S101–107.

$$Mrev = \int \theta Me / (\int \theta Tm \cdot P) \qquad \text{[Formula 2]}$$

Wherein, P indicates the number of pole pairs of the motor resolver 44.

For example, in case the mechanical angle θTm of 1440 degrees corresponding to the four rotations of the steering wheel 21 and the actual motor electric angle θMe are integrated at Steps S101–S107, for example supposing that the mechanical error and the dispersion are not exist, ∫θMe assumes 82656(=1440·57.4) and ∫θTm·P assumes 10080 (=1440·7). Thus, the speed ratio Mrev is calculated as 8.2(=82656/10080). Step 109 serves as a speed ratio calculation means.

At Step S111, the speed ratio calculated at Step S109 is set as the control parameter of the electric power steering device 20. Step S111 serves as a parameter setting means. For example, the speed ratio Mrev may be set as the control parameter used for obtaining the product value r(=Mrev·P) of formula 1. In the foregoing example, because the value of the speed ratio Mrev is obtained as 8.2, by determining the speed ratio Mrev as the control parameter, the product value r is determined as 57.4(=8.2·7).

The speed ratio Mrev may be set each time by the control parameter setting transaction. However, because setting the speed ratio Mrev each time increases the calculation transaction load at the CPU 61 of the ECU 60, the transaction load of the CPU 61 is reduced by reading the once obtained speed ratio Mrev and memorized in the memory device. By setting the speed ratio Mrev regularly (e.g., by ten minutes or by one hour) by the control parameter setting transaction, the speed ratio Mrev considering to the dispersion, or the like, is set as the control parameter when the dispersion, or the like, is generated at the mechanical parts, or the like, of the steering mechanism due to the temperature change and the change per time. In this case, the control parameter setting transaction is regularly started by a timer transaction, or the like, for calculating a predetermined period.

At Step S113, the speed ratio Mrev calculated at Step S109 is written in the nonvolatile memory. More particularly, for example, the information (data) concerning to the speed ratio Mrev is written in the nonvolatile memory 62 (e.g., EEPROM such as the flash memory) included in the ECU 60 to be memorized therein. Thus, for example, at the inspection process at the shipment of the electric power steering device 20 and at a maintenance process after the shipment, or the like, the calculated speed ratio Mrev is memorized in the ECU 60 by carrying out the control parameter setting transaction.

As foregoing, with the electric power steering device 20, the speed ratio Mrev between the mechanical angle θTm of the steering wheel 21 and the motor 40 is obtained based on the mechanical angle θTm of the steering wheel 21 obtained from the first steering angle θT1 detected by the first resolver 35 and the second steering angle θT2 detected by the second resolver 37, and the actual motor electric angle θMe detected by the motor resolver 44 (S109). Thereafter, the speed ratio Mrev is set as the control parameter used for providing the product value r(=Mrev·P) of the formula 1 for obtaining the calculated motor electric angle θMe (A) (A=−2, −1, 0, 1) (S111).

Thus, for example, the speed ratio Mrev may be obtained considering the machining error and the dispersion generated at the rack groove 24a of the rack groove 24 and the pinion gear 23c of the pinion shaft 23, or the like, included in the steering mechanism. Accordingly, the speed ratio Mrev obtained considering the error, or the like, generated at the mechanical parts such as the steering mechanism can be set as the control parameter of the electric power steering device 20. Thus, the control parameter for accurately detecting the absolute rotational position of the steering wheel 21 relative to the electric power steering device 20 is attained. With the electric power steering device 20 set with the speed ratio Mrev, the absolute rotational position of the steering wheel 21 can be accurately detected to control the motor 40 for assisting the steering operation based on the absolute rotational position.

Although the embodiment of the present invention is explained with the electric power steering device 20, the embodiment of the present invention is not limited. For example, the ECU 60 included in the electric power steering device 20 may be constructed as an independent computer system (i.e., including a CPU, a memory device, an input-output device, an interface device, or the like) separated from the electric power steering device 20 and a control parameter setting system for executing the control parameter setting transaction shown in FIG. 6 by the computer system may be constructed. In this case, the obtained speed ratio Mrev is memorized in a memory device (including the nonvolatile memory) included in the ECU 60 of the electric power steering device 20. Accordingly, the speed ratio Mrev can be set at the electric power steering device 20 without applying the load at the ECU 60 of the electric power steering device 20.

According to the embodiment of the present invention, the mechanical angle of the steering shaft is determined by the first resolver and the second resolver, and the motor electric angle of the motor is detected by the third resolver. Thus, for example, the speed ratio can be obtained considering the dispersion and the machining error, or the like, generated at the rack and the pinion gear included in the steering mechanism. Accordingly, the speed ratio obtained considering the error, or the like, generated at the mechanical parts of the steering mechanism, or the like, can be set as the control parameter of the electric power steering device, which allows to set the control parameter for accurately detecting the absolute rotational position of the steering wheel relative to the electric power steering device. With the electric power steering device set with the foregoing speed ratio, the absolute rotational position of the steering wheel can be accurately detected.

According to the embodiment of the present invention, the control means includes the memory means for memorizing the speed ratio or the control parameter. Thus, after obtaining the speed ratio, it may not be required to obtain the speed ratio by reading in the speed ratio from the memory means. Accordingly, it is not necessary to obtain the speed ratio every time by the control means of the electric power steering device, which reduces the transaction load of the control means to enable the high speeding of the transaction speed.

According to the embodiment of the present invention, the motor is controlled based on the absolute rotational position of the steering wheel obtained from the first steering angle, the second steering angle, and the motor electric angle using the control parameter set by the control parameter setting device or the setting method of the control parameter. Because the speed ratio obtained considering the error, or the like, likely to be generated at the mechanical pasts of the steering mechanism, or the like, included in the electric power steering device is set as the control parameter of the electric power steering device, the absolute rotational position of the steering wheel can be accurately detected using the control parameter. Thus, the absolute operational position of the steering wheel can be accurately detected to control the motor for assisting the steering operation based on the absolute operational position.

The principles, preferred embodiment and mode of operation of the present invention have been described in the foregoing specification. However, the invention which is intended to be protected is not to be construed as limited to the particular embodiment disclosed. Further, the embodiment described herein is to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A method for setting a control parameter for an electric power steering device comprising: a first resolver for detecting a first steering angle including a rotation angle of a steering shaft connected to a steering wheel; a second resolver for detecting a second steering angle including a rotation angle of the steering shaft, the second resolver including pole pairs having a different number from the first resolver; a rack and pinion type steering mechanism including a rack shaft geared with a pinion shaft coaxially connected to the steering shaft; a motor for assisting an actuation of the rack shaft; a third resolver for detecting a motor electric angle including a rotation angle of the motor; and a control means for controlling the motor based on an absolute rotational position of the steering wheel obtained from the first steering angle, the second steering angle, and the motor electric angle; the setting method comprising process of:

obtaining a speed ratio between the steering shaft and the motor based on a mechanical angle at the steering shaft obtained from the first steering angle and the second steering angle and the motor electric angle of the motor; and setting the speed ratio as a control parameter used for obtaining the absolute rotational position of the steering wheel from the first steering angle, the second steering angle, and the motor electric angle at the control means.

2. The method for setting the control parameter according to claim 1, wherein the control means includes a memory means and the speed ratio or the control parameter is input in the memory means.

3. A setting device for a control parameter of a power steering device including a rack and pinion type steering mechanism including a rack shaft geared with a pinion shaft coaxially connected to a steering shaft connected to a steering wheel, and a motor for assisting an actuation of the rack shaft, comprising:
- a first resolver for detecting a first steering angle including a rotation angle of the steering shaft;
- a second resolver for detecting a second steering angle including a rotation angle of the steering shaft, the second resolver including pole pairs having a different number from the first resolver;
- a third resolver for detecting a motor electric angle including a rotation angle of the motor; and
- a control means for controlling the motor based on an absolute rotational position of the steering wheel obtained from the first steering angle, the second steering angle, and the motor electric angle, the setting device comprising:
- a speed ratio calculation means for obtaining a speed ratio between the pinion shaft and the motor based on a mechanical angle at the pinion shaft side obtained from the first steering angle and the second steering angle and the motor electric angle of the motor; and
- a parameter setting means for setting the obtained speed ratio at the control means as a control parameter used for obtaining the absolute rotational position of the steering wheel from the first steering angle, the second steering angle, and the motor electric angle.

4. The setting device for the control parameter according to claim 3, wherein the control means includes a memory means and the speed ratio or the control parameter is input in the memory means.

5. An electric power steering device comprising:
- a first resolver for detecting a first steering angle including a rotation angle of a steering shaft connected to a steering wheel;
- a second resolver for detecting a second steering angle including a rotation angle of the steering shaft, the second resolver including pole pairs having a different number from the first resolver;
- a rack and pinion type steering mechanism including a rack shaft geared with a pinion shaft coaxially connected to the steering shaft;
- a motor for assisting an actuation of the rack shaft;
- a third resolver for detecting a motor electric angle including a rotation angle of the motor; and
- a control means for controlling the motor;
- an absolute rotational position of the steering wheel obtained from the first steering angle, the second steering angle, and the motor electric angle by obtaining a speed ratio between the steering shaft and the motor based on a mechanical angle at the steering shaft obtained from the first steering angle and the second steering angle and the motor electric angle of the motor; and setting the speed ratio as a control parameter used for obtaining the absolute rotational position of the steering wheel from the first steering angle, the second steering angle, and the motor electric angle at the control means.

6. The electric power steering device according to claim 5, wherein the control means includes a memory means and the speed ratio or the control parameter is input in the memory means.

7. An electric power steering device comprising:
- a first resolver for detecting a first steering angle including a rotation angle of a steering shaft connected to a steering wheel;
- a second resolver for detecting a second steering angle including a rotation angle of the steering shaft, the second resolver including pole pairs having a different number from the first resolver;
- a rack and pinion type steering mechanism including a rack shaft geared with a pinion shaft coaxially connected to the steering shaft;
- a motor for assisting an actuation of the rack shaft;
- a third resolver for detecting a motor electric angle including a rotation angle of the motor; and
- a control means for controlling the motor;
- based on an absolute rotational position of the steering wheel obtained from the first steering angle, the second steering angle, and the motor electric angle using the control parameter set by a setting device of a control parameter, further comprising:
- a speed ratio calculation means for obtaining a speed ratio between the steering shaft and the motor based on a mechanical angle at the steering shaft obtained from the first steering angle and the second steering angle and the motor electric angle of the motor; and
- a parameter setting means for setting the obtained speed ratio at the control means as a control parameter used for obtaining the absolute rotational position of the steering wheel from the first steering angle, the second steering angle, and the motor electric angle.

8. The electric power steering device according to claim 7, wherein the control means includes a memory means and the speed ratio or the control parameter is input in the memory means.

* * * * *